United States Patent [19]

Gallitzendorfer et al.

[11] 4,088,366
[45] May 9, 1978

[54] BAR PROJECTING FROM WINDSHIELD COLUMN OF A MOTOR VEHICLE

[75] Inventors: Josef Gallitzendorfer; Peter Pfeiffer; Johann Tomforde, all of Sindelfingen; Hans Gotz, Boblingen, all of Germany

[73] Assignee: Daimler-Benz Aktiengesellschaft, Germany

[21] Appl. No.: 709,120

[22] Filed: Jul. 27, 1976

[30] Foreign Application Priority Data

Aug. 2, 1975 Germany .............................. 2534686

[51] Int. Cl.² ............................................... B60J 9/00
[52] U.S. Cl. ........................................ 296/154; 49/476
[58] Field of Search ............... 296/154, 84 R; 49/471, 49/476, 479, 486

[56] References Cited

U.S. PATENT DOCUMENTS

| 2,635,918 | 4/1953 | Muckle | 296/154 |
| 3,938,856 | 2/1976 | Janssen | 296/154 |

Primary Examiner—Philip Goodman
Attorney, Agent, or Firm—Craig & Antonelli

[57] ABSTRACT

A strip-like profile projecting from a windshield column of a motor vehicle which forms a water-collecting channel open in the direction toward the windshield and in which the water rising during the drive is conducted in the direction toward the vehicle roof; the strip-like profile is thereby extended at its upper end around toward the top side of the windshield while the water-collecting channel discharges into a channel extending approximately parallel to the center longitudinal axis of the motor vehicle.

12 Claims, 3 Drawing Figures

BAR PROJECTING FROM WINDSHIELD COLUMN OF A MOTOR VEHICLE

The present invention relates to a strip projecting from a windshield column which forms a water-collecting channel open in the direction toward the windshield, in which the water rising during the drive is conducted in the direction of the motor vehicle roof.

Such an arrangement for the prevention of a soiling of the side windows is described in the German Offenlegungsschrift No. 1,802,853. The strip thereby passes over within the lateral roof end area into a protective strip profile which is mounted on the flanged edged formed by the roof frame and the roof planking and terminates at the base point of the rear column. By reason of dimensional deviations conditioned on manufacture, it is not possible to make the strip and the covering in one piece. Instead, an adaptation to the respective vehicle body has to be undertaken from case to case which, of course, is expensive.

The prior art arrangement, howeve, entails still another disadvantage. Thus, the wind noises increase considerably by the necessarily projecting strips or ledges and by the deflecting edge pointing in the driving direction above all in the transition area of the column-roof and roof-door frame. The air resistance coefficient is thereby also influenced negatively. Since these projecting anti-soiling devices, i.e., intended to keep free of dirt certain vehicle areas such as the side windows, are located within the impact zones of passengers, the prior art solution is not satisfactory.

It is the aim of the present invention to provide a shield which, circumventing the described disadvantages of the prior art construction, merges harmonically into the overall appearance of the motor vehicle.

Consequently, a strip-like profile member projecting from a windshield column of a motor vehicle is proposed which forms a water-collecting channel open in the direction toward the windshield, and in which the water rising during the drive is conducted in the direction toward the motor vehicle roof whereby, according to the present invention, the strip-like profile member is extended at its upper end around to the top side of the windshield, and whereby the water-collecting channel terminates in a channel extending in the roof approximately parallel to the center longitudinal axis of the motor vehicle.

Welding seams provided within the course of the channel require no after-machining or after-finishing work, if the channel receives an approximately C-shaped profiled decorative strip which may project beyond the contour of the roof in the direction of the side surface of the motor vehicle.

Accordingly, it is an object of the present invention to provide a strip projecting from a windshield column of a motor vehicle which avoids by simple means the aforementioned shortcomings and drawbacks encountered in the prior art.

Another object of the present invention resides in a strip-like molding forming a water-collecting channel which offers considerable savings in manufacture and assembly and increases the safety to bystanding pedestrians.

A further object of the present invention resides in a strip projecting from a windshield column of a motor vehicle which considerably decreases the noise and favorably affects the aerodynamic factors of the vehicle.

Another object of the present invention resides in a strip-like molding of the type described above which forms a water-collecting channel that effectively collects the water and prevents soiling of the side windows, yet can be harmonically incorporated into the overall appearance of the vehicle.

These and other objects, features and advantages of the present invention will become more apparent from the following description when taken in connection with the accompanying drawing which shows, for purposes of illustration only, one embodiment in accordance with the present invention and wherein.

Figure 1:
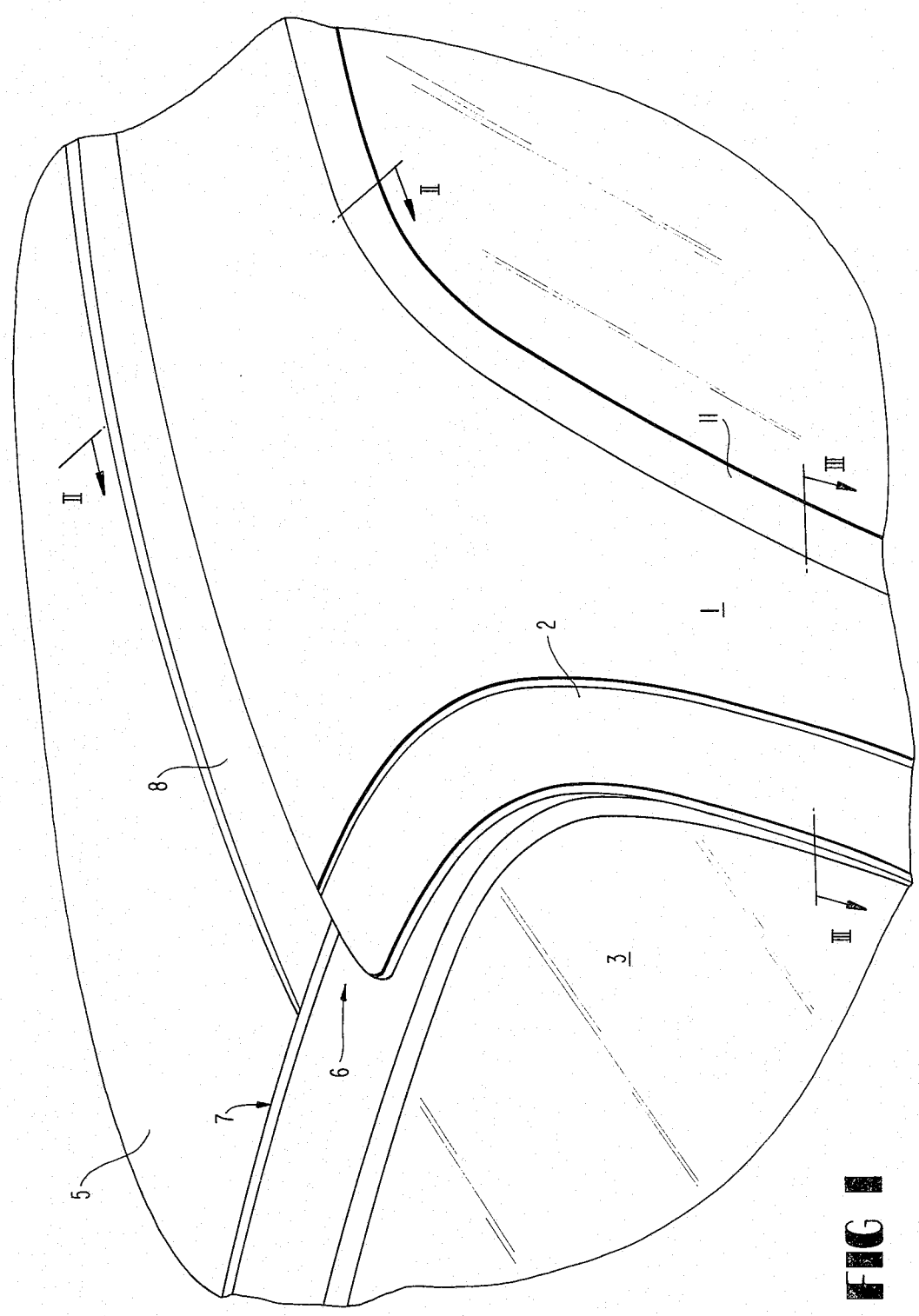
FIG. 1 is a partial perspective view of a shield within the roof area of a motor vehicle which forms a water-collecting channel in accordance with the present invention.

Referring now to the drawing wherein like reference numerals are used throughout the various views to designate like parts, a strip-like profile member 2 mounted on a left windshield column 1 of a motor vehicle, not illustrated in detail, which, however, may also be a component of the windshield column 1, forms a water-collecting channel generally designated by reference numeral 4 which is open in the direction toward the windshield pane 3. The soiled or dirty water collecting in the channel 4 is conducted upwardly in the direction toward the roof 5, where it flows off or drains into a channel 8 by reason of extending the upper end 6 of the strip-like profile member 2 around to the top side 7 of the windshield 3. The channel 8 extends approximately parallel to the center longitudinal axis of the motor vehicle and may--as indicated in dash and dotted lines in FIG. 2--be provided with a decorative strip 9 which projects out of the contour of the roof 5 in the direction toward the side surface 10 of the motor vehicle.

Figure 2:
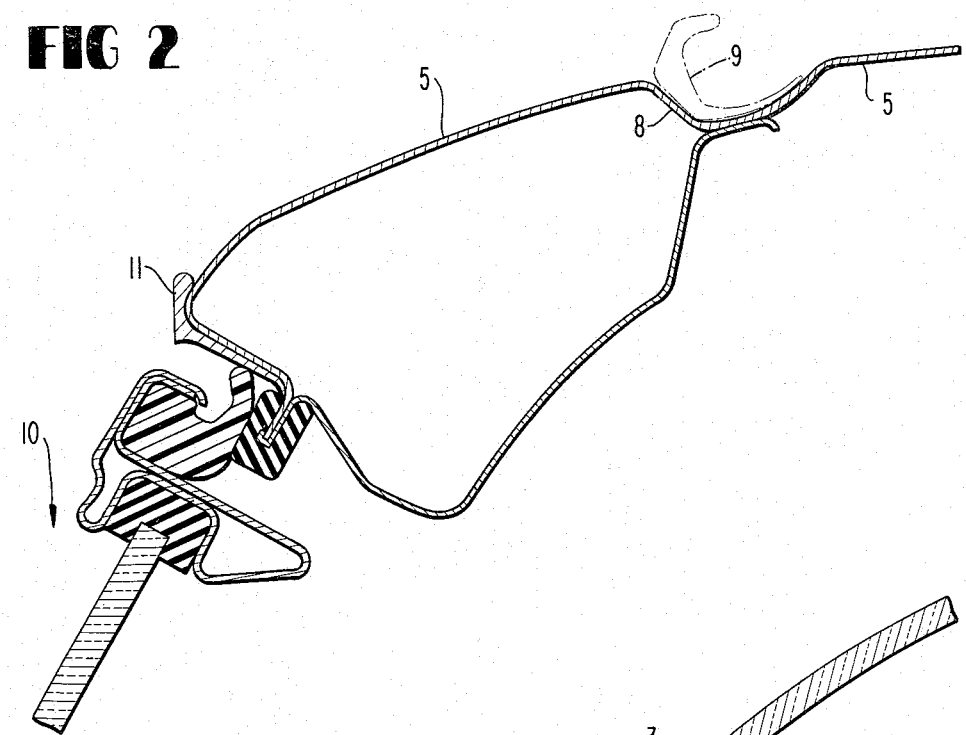
FIG. 2 is a cross-sectional view taken along line II—II of FIG. 1.
Figure 3:
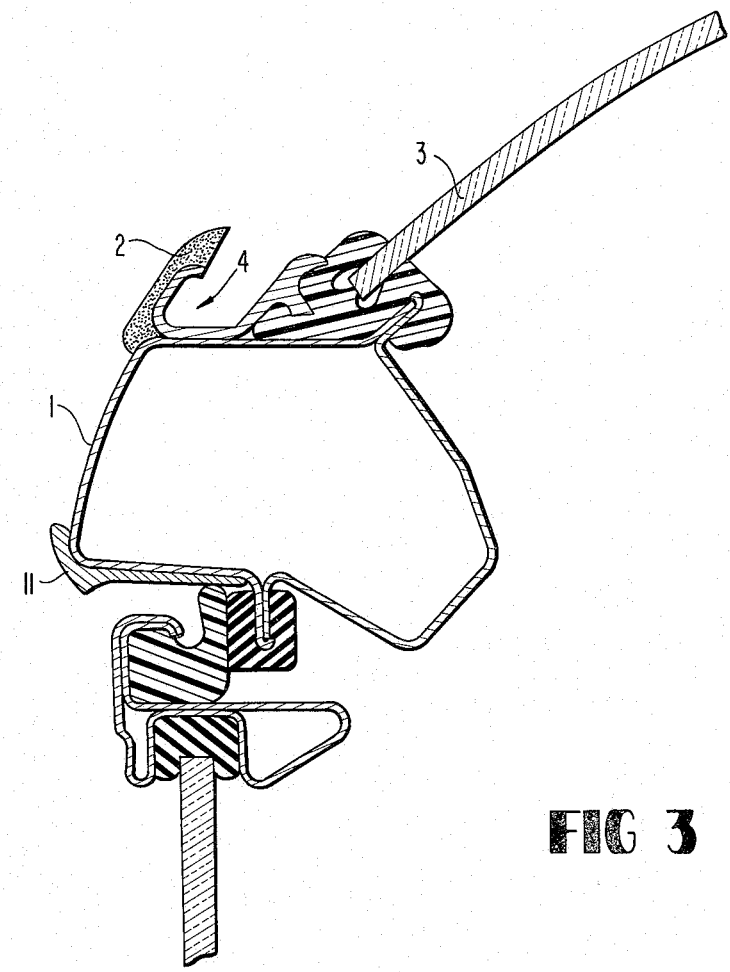
FIG. 3 is a cross-sectional view taken along line III—III of FIG. 1.

The decorative strip 9 may serve for covering welding seams provided in the course of the channel 8 and also receives larger water quantities. As a result thereof, one is able to dispense with heretofore customary water-collecting channels located in the impact zone of pedestrians and only needs to mount a rain-conducting strip 11 (FIGS. 1 - 3) provided with a drip-edge constructed, for example, as edge-protecting profile, for the accommodation or reception of the water impinging in the area between the channel 8 and the side surface 10, whereby the rain-conducting strip 11 projects only slightly from the roof 5 as can be seen in FIG. 2. By the elimination of the heretofore customary water-collecting channel, more design possibilites as regards shape in the roof- and window-area will result whereby also better rigidity values can be attained by another construction of the hollow bearers within this area.

Better connecting possibilites of the windshield column head portion to the roof frame result from the round inlet of the water-collecting channel in the roof planking according to the present invention. This organic transition entails higher rigidity values against elastic loads and stresses as well as against plastic deformations.

Since the water-conducting strip is completely integrated into the vehicle shape and since turbulences can hardly impair the air flow, also a lower air resistance coefficient and a reduction of the wind noises will result.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A strip-like structure projecting from a windshield column of a motor vehicle which forms a water-collecting channel open so as to receive water flowing off the windshield pane, within which the water rising during the drive is conducted in the direction toward the vehicle roof, characterized in that a strip-like profile means forming a water-collecting channel is extended at its upper end around toward the top side of the windshield, and in that the water-collecting channel formed by said strip-like profile means terminates in a channel extending in the roof approximately parallel to the center longitudinal axis of the motor vehicle, said water collecting channel being positioned relative to said channel means in a manner enabling water to flow from said water-collecting channel into said channel extending in the roof.

2. A strip-like structure projecting from a windshield column of a motor vehicle which forms a water-collecting channel open in the direction toward the windshield pane, within which the water rising during the drive is conducted in the direction toward the vehicle roof, characterized in that a strip-like profile means is extended at its upper end around toward the top side of the windshield, and in that the water-collecting channel formed by said strip-like profile means terminates in a channel extending in the roof approximately parallel to the center longitudinal axis of the motor vehicle, characterized in that the channel in the roof receives an approximately C-shaped profiled decorative strip means.

3. A strip-like structure according to claim 2, characterized in that said decorative strip means projects beyond the contour of the roof in the direction toward the side surface of the motor vehicle.

4. A motor vehicle roof supported by windshield columns, which comprises strip means projecting from the windshield columns and forming water-collecting channels which are open in a manner so as to receive water flowing off the windshield for causing water rising during the drive to be conducted in said water-collecting channels in the direction toward the vehicle roof to thereby protect side windows of the vehicle against soiling, the strip means being extended at the upper end thereof around to the top side of the windshield, and the water-collecting channels terminating in at least one channel means provided in the roof and extending toward the rear, said water-collecting channels being positioned relative to said channel means in a manner enabling water to travel from said water-collecting channels into said channel means.

5. A roof according to claim 4, wherein said channel means are formed by recessed contours of panel means forming the roof.

6. A roof according to claim 5, wherein said channel means are located in upper surfaces of the roof and displaced from door areas of the vehicle of which the roof forms a part.

7. A motor vehicle roof supported by windshield columns, which comprises strip means projecting from the windshield columns and forming water-collecting channels opin in the direction toward the windshield, water rising during the drive to be conducted in said water-collecting channels in the direction toward the vehicle roof to thereby protect side windows of the vehicle against soiling, the strip means being extended at the upper end thereof around to the top side of the windshield, and the water-collecting channels terminating in at least one channel means provided in the roof and extending toward the rear, characterized in that each channel means extends approximately parallel to the center longitudinal axis of the vehicle.

8. A roof according to claim 1, characterized in that an approximately C-shaped decorative strip is mounted in each channel means which projects beyond the contour of the roof in the direction toward the respective side surface of the vehicle.

9. A roof according to claim 8, characterized by a rain-conducting strip means having a dripping edge for the water impinging on the roof between a channel means and the respective side surface of the vehicle, said rain-conducting strip means being mounted on the roof within the area of its longitudinal bearers.

10. A roof according to claim 4, characterized in that an approximately C-shaped decorative strip is mounted in each channel means which projects beyond the contour of the roof in the direction toward the respective side surface of the vehicle.

11. A roof according to claim 4, characterized by a rain-conducting strip means having a dripping edge for the water impinging on the roof between a channel means and the respective side surface of the vehicle, said rain-conducting strip means being mounted on the roof within the area of its longitudinal bearers.

12. A roof according to claim 7, characterized in that two channel means are provided, one each for a respective windshield column.

* * * * *